United States Patent [19]

Wijesinghe et al.

[11] Patent Number: 5,237,897

[45] Date of Patent: * Aug. 24, 1993

[54] AUTOMATIC BANDMILL STRAIN AND SAW TRACKING METHOD AND APPARATUS

[75] Inventors: Ralph Wijesinghe, Vancouver; Edward H. Komori, Surrey, both of Canada

[73] Assignee: Seneca Sawmill Company, Eugene, Oreg.

[ * ] Notice: The portion of the term of this patent subsequent to Jan. 5, 2010 has been disclaimed.

[21] Appl. No.: 837,658

[22] Filed: Feb. 14, 1992

Related U.S. Application Data

[63] Continuation of Ser. No. 551,050, Jul. 11, 1990, abandoned, which is a continuation of Ser. No. 407,727, Sep. 11, 1989, abandoned, which is a continuation of Ser. No. 259,482, Oct. 19, 1988, abandoned, which is a continuation of Ser. No. 20,985, Mar. 2, 1987, abandoned.

[51] Int. Cl.$^5$ ............................................. B27B 13/08
[52] U.S. Cl. ............................................. 83/72; 83/76.7; 83/817; 83/819
[58] Field of Search ............... 83/789, 814, 816, 817, 83/818, 819, 661, 13, 72, 76.7; 51/135 BT

[56] References Cited

U.S. PATENT DOCUMENTS

| | | | |
|---|---|---|---|
| 1,392,990 | 10/1921 | Vaughan | 83/818 |
| 2,395,237 | 2/1946 | Swenson | 83/98 |
| 2,644,492 | 7/1953 | Crane | 83/817 |
| 3,118,314 | 1/1964 | Schuster | 74/241 |
| 3,128,661 | 4/1964 | Diehl et al. | 83/201 |
| 3,323,699 | 6/1967 | Bricker | 226/15 |
| 3,504,458 | 4/1970 | Rutt | 51/135 BT |
| 3,570,735 | 3/1971 | Kurz | 226/3 |
| 3,838,620 | 10/1974 | Baldrey et al. | 83/819 |
| 3,971,166 | 7/1976 | Habeck et al. | 51/135 BT |
| 4,187,645 | 2/1980 | Lind | 51/135 BT |
| 4,294,044 | 10/1981 | Hansen | 51/135 BT |
| 4,329,901 | 5/1982 | Stroud | 83/819 |
| 4,337,598 | 7/1982 | Barth et al. | 51/135 BT |
| 4,597,132 | 7/1986 | Elmer et al. | 83/819 |

FOREIGN PATENT DOCUMENTS

| | | | |
|---|---|---|---|
| 895668 | 3/1972 | Canada | 83/817 |
| 627960 | 8/1978 | U.S.S.R. | 83/819 |

OTHER PUBLICATIONS

Japanese Publication Mokuzai Gakkaishi, vol. 28, No. 12, pp. 783-787 (1982). Title: Feedback Control Of The Running Position Of A Band Saw With An Actuator, Nobuaki Hattori et al.

Primary Examiner—Hien H. Phan
Attorney, Agent, or Firm—Dellett, Smith-Hill and Walters

[57] ABSTRACT

The invention provides a bandmill having an endless loop of bandsaw blade which is automatically strained to a desired tension, and automatically driven at an accurate location or tracking position. The bandmill runs on a pair of spaced co-planar wheels, which are forced longitudinally apart to apply strain to the bandsaw. Actual saw strain is automatically detected by a force transducer within the strain mechanism, and the actual saw strain is automatically compared electronically with a desired saw strain. A servo-controller automatically adjusts distance between the wheels to vary force therebetween so that actual saw strain is varied to approach the desired saw strain. Also, actual tracking of the saw blade relative to the wheels is automatically sensed by sensors located adjacent the edge of the saw blade. The actual tracking of the saw blade is compared electronically relative to a desired tracking position, and tilt of a tiltable wheel is automatically adjusted so that actual tracking of the saw on the wheels is varied to approach the desired tracking position. Alternatively, a visual display of actual tracking accuracy can be obtained, so as to permit manual adjustment of the tiltable wheel to correct inaccurate tracking.

33 Claims, 6 Drawing Sheets

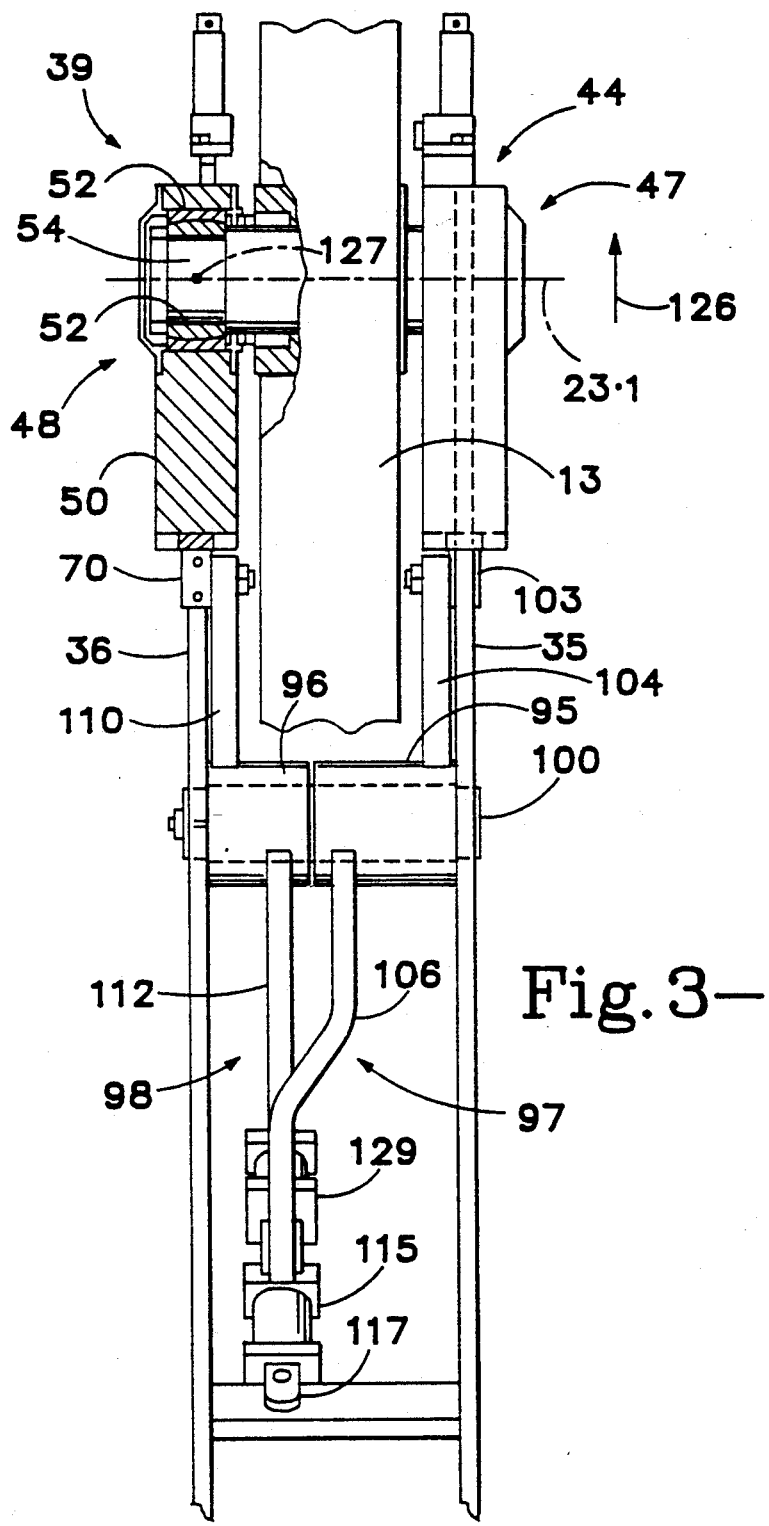
Fig.3-A

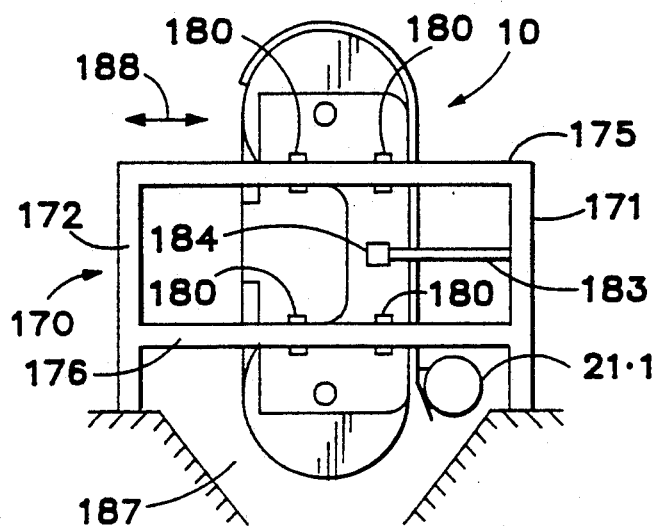
Fig. 6
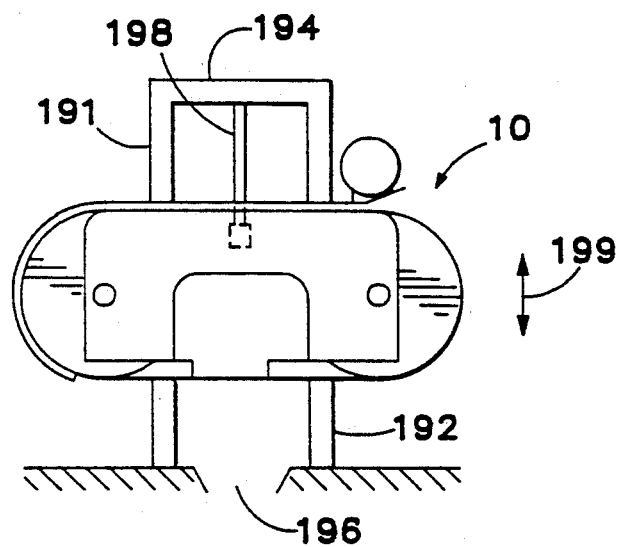
Fig. 7
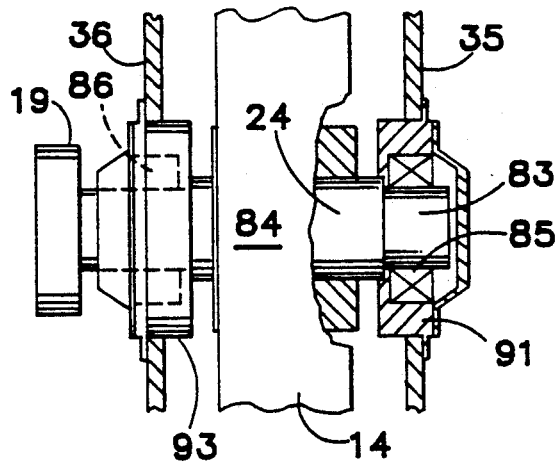
Fig. 3-B

AUTOMATIC BANDMILL STRAIN AND SAW TRACKING METHOD AND APPARATUS This is a continuation of co-pending application Ser. No. 07/551,050 filed Jul. 11, 1990 and now abandoned, which was filed as a continuation of application Ser. No. 07/407,727 filed Sep. 11, 1989, now abandoned, which was filed as a continuation of application Ser. No. 07/259,482 filed Oct. 19, 1988, now abandoned, which was filed as a continuation of application Ser. No. 07/020,985 filed Mar. 2, 1987, now abandoned.

FIELD OF THE INVENTION

The invention pertains to a bandmill in which a bandsaw blade is tensioned between two wheels, and is particularly adapted for sawing wood.

BACKGROUND OF THE INVENTION

A conventional bandmill has a pair of spaced, co-planar wheels which carry and drive an endless loop of bandsaw blade. A strain mechanism is provided to force the wheels apart along a longitudinal axis for applying load to, or tensioning the saw, commenly called "straining the saw". Many types of mechanisms for straining the saw have been devised. Some of these mechanisms use mechanical links and a hanging weight system, termed a "dead weight lever mechanism", but this system has inherent limitations mainly due to friction between the various mechanical components and inertia of the weight, both of which contribute to a system having poor sensitivity, a slow response, and poor damping. Sensitivity can be defined as the minimum additional force required to produce a unit increase in actual saw strain in response to a unit increase in strain applied to the saw straining mechanism. With a system having poor sensitivity, it is difficult to know the exact strain applied to the saw, and consequently difficult to take corrective action so as to run the saw at the desired strain. A slow response results in a relatively long response time between a sudden increase in load on the saw blade and the strain system reacting to accommodate the sudden load increase. This slow response tends to result in the saw being over strained, and can occur when the saw is subjected to a lateral force which deflects the saw from its normal cutting plane. Excessive saw strain tends to result in premature failure of the saw, as well as excessive wear of the strain system. Poor damping characteristics result in "overshoot or undershoot" of the strain mechanism, thus running the saw for undesirably long periods away from the desired saw strain.

To prevent a saw from running off the wheels, either one or both of the wheels of a conventional bandmill are "tilted". A wheel is "tilted" by rotating the wheel arbor about an axis disposed normally to the axis of rotation of the wheel, and normally to the longitudinal axis extending between the wheels. A saw is termed as "tracking accurately" if the saw runs on its wheels in a desired location with negligble adjustment during cutting. Accurate tracking is important to avoid excessive saw tooth overhang which reduces accuracy, and in the extreme to avoid loss of the saw from flying off the wheels, causing danger to operators as well as damaging the saw. Insufficient overhang of the saw teeth causes the teeth of the saw to contact the wheels themselves, which damages both the saw and the wheels. In practice, preferably the saw blade passes over the wheels so that the saw tooth gullets between the teeth protrude a small distance, typically 2 mm to 5 mm beyond the edges of the wheels. Faces of the wheels carrying the saw are commonly "crowned", which provides a raised center portion of the face of the wheel which assists in tracking of the saw. Also, most saws are "roll tensioned" which is a pre-stressing treatment of the saw prior to installation on the bandmill. Roll tensioning is designed to ensure that the cutting or leading edge portion of the saw is always maintained at a higher tension than the center and/or trailing edge portion of the saw. By maintaining the cutting edge of the saw at a higher tension than remaining portions of the saw, heat produced during cutting does not cause the leading edge of the saw to "slacken", that is to lose tension so that the leading edge operates at a lower tension than remaining portions of the saw. If the leading edge of the saw slackens during use, sawing accuracy decreases, and the saw has a greater tendency to lose its track on the wheels, increasing danger to operators and risk of damage to the equipment.

In order to maintain accurate tracking of the saw, at least one wheel is tilted so that the axis of rotation of that said one wheel is shifted relative to the axis of rotation of remaining wheel. Normally, with an ideal saw, axes of arbors of the wheels mounting the saw will be parallel to each other, and within a common longitudinal plane, which is parallel to a cutting portion of the saw blade. When one wheel is tilted, its axis is shifted so as to be non-parallel to the remaining axis, and yet remains within the common longitudinal plane containing the remaining axis. Wheel tilting is usually effected by moving one end portion of the movable wheel arbor away from, or towards, the remaining wheel arbor, thus shifting the axis of the wheel.

Both setting the strain of the saw, and adjusting tilt of the wheel so that the saw maintains accurate tracking requires manual adjustment by a bandmill operator. With some strain mechanisms, actual saw strain cannot be accurately or easily determined, due to the inherent limitations of the strain mechanism. With other strain mechanisms, the applied strain can be varied considerably by sawing conditions, for example, fluctuations in saw load due to presence of knotholes, frozen lumber, etc. which tend to deflect the saw from its normal cutting plane. These irregularities increase strain on the saw, and it is virtually impossible for the operator to accommodate sudden strain changes by adjusting the applied strain. Likewise, if the saw becomes excessively heated, and tracking of the saw deteriorates such that corrective action is required, it can be difficult for an operator to respond sufficiently quickly to manually adjust the wheel tilt to reduce loss of tracking accuracy.

From the above discussion, it can be seen that the bandmill operator is required to adjust the strain mechanism to maintain saw strain within a desired strain range, together with adjusting wheel tilt to maintain accuracy of tracking of the saw on the wheels. These adjustments are performed manually and require care and skill, and sometimes require additional adjustment.

All bandmills known to the inventors are relatively wide and can only be used in a specific disposition, i.e. as a vertical, horizontal or slanting bandmill, and this disposition cannot be changed. When conventional bandmills are placed side by side, they require a considerable space and length of feed conveyor which increases cost of multiple bandmill installations. Also, if a sawmill operator wishes to change a vertical bandmill to a horizontal bandmill, it would be essentially impossible, and an alternative bandmill would be required. This reduces flexibility of sawmill plant layout.

SUMMARY OF THE INVENTION

The invention reduces the difficulties and disadvantages of the prior art by providing a bandmill strain mechanism which essentially continuously monitors bandmill strain, and, through a control means, also adjusts applied strain so as to maintain the saw strain within a desired range. Also, the invention continuously monitors tracking of the saw relative to a desired tracking datum, and variations of actual tracking from the tracking datum are detected. If the tracking variations are excessive, the invention provides a rapid corrective action by a wheel tilting mechanism which responds automatically to tilt the wheel, so as to bring the saw back into a desired tracking range.

The invention also provides a band mill structure which has an overall relatively narrow width, which permits locating bandmills in series along a conveyor in such a way that overall length occupied by the band mills of the invention is considerably less than prior art band mills, thus reducing conveyor length and cost. This also facilitates control of multiple band mills in a closely packed group. Furthermore, the band mill structure can be easily modified from a conventional vertical band mill, into a horizontal band mill by changing support brackets and means to set the band mill so as to vary saw cut width. Thus one sample of band mill can be converted to other types of band mill, thus greatly increasing flexibility of a saw mill layout.

A bandmill according to the invention has a body, and first and second co-planar wheels spaced apart along a longitudinal axis of the body and adapted to carry and drive an endless saw. The first wheel is moveable generally longitudinally of the body to vary saw strain. The bandmill also includes strain sensing means and strain control means. The strain sensing means produces a strain output signal which reflects applied source strain. The strain control means is for selectively moving automatically the first wheel along the longitudinal axis to maintain a desired source strain. The strain control means co-operates with the first wheel and the strain sensing means so as to be responsive to the strain output signal.

Another embodiment of the invention includes a bandmill having a body, and first and second co-planar wheels spaced apart along the longitudinal axis of the body and adapted to carry and drive an endless saw. The first wheel is moveable generally longitudinally of the body to vary saw strain. The bandmill also includes tilting means, saw tracking sensing means, and saw tracking control means. The tilting means is for tilting one wheel about a second axis to provide a tiltable wheel to vary tracking of the saw on the wheels, the second axis being normal to the longitudinal axis. The saw tracking means is for producing a tracking output signal which reflects tracking of the saw relative to the wheels. The saw tracking control means is for selectively tilting the tiltable wheel to maintain the saw within a desired tracking position. The tracking control means cooperates with the tilting means and the tracking sensing means so as to be responsive to the tracking output signal.

Another aspect of the invention relates to a bandmill having a body, first and second wheels, first and second wheel arbors, and a strain control means. The body has first and second side members spaced apart and disposed generally parallel to each other, the side members being generally flat sheet members and having aligned recesses adjacent opposite ends thereof. The first and second wheels are co-planar and spaced apart along a longitudinal axis of the body and adapted to carry and drive an endless bandsaw. The wheels are located between the first and second side members generally adjacent the aligned recesses thereof. The first wheel arbor journals the first wheel for rotation, and first and second arbor mounting means are provided for carrying the first wheel arbor. The arbor mounting means co-operate with a first pair of aligned recesses at one end of the first and second side members respectively to permit guided movement of the arbor mounting means relative to the body, which movement is generally parallel to the longitudinal axis. The second wheel arbor journals the second wheel for rotation, and has end portions co-operating with a second pair of aligned recesses at the ends of the side members. The strain control means is for selectively moving the first wheel along the longitudinal axis to strain the saw, the strain control means being located between the first and second side members to provide a compact unit.

A detailed disclosure following, related to drawings, describes a preferred apparatus and method according to the invention, which is capable of expression in structure and method other than those particularly described and illustrated.

DESCRIPTION OF THE DRAWINGS

FIG. 6 is a diagram showing the bandmill mounted vertically, FIG. 7 is a diagram showing the bandmill mounted horizontally.

DETAILED DISCLOSURE

FIGS. 1-4

Figure 1:
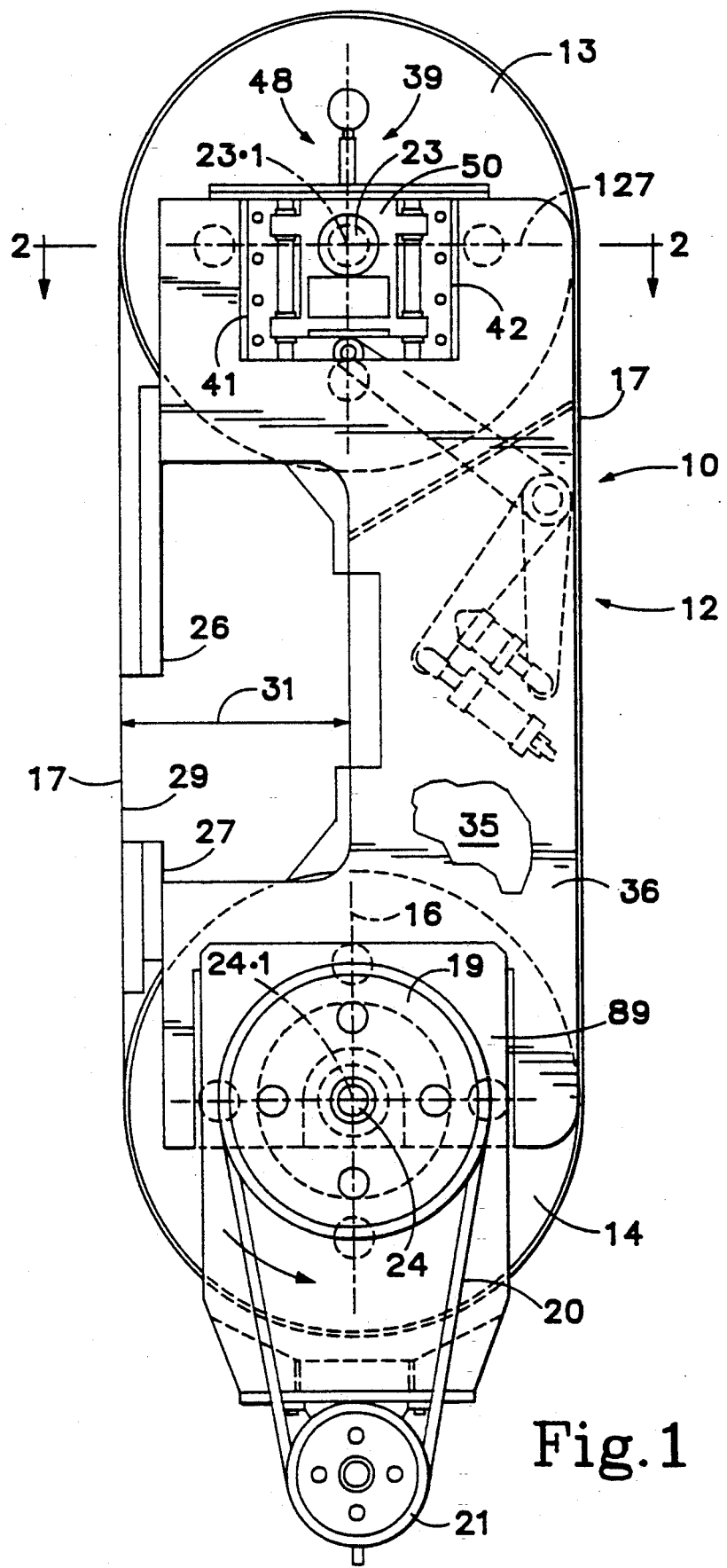
FIG. 1 is a simplified side elevation of a band mill according to the invention, some hidden detail being shown.

A band mill 10 according to the invention has a body 12, and first and second co-planar wheels 13 and 14, positioned adjacent upper and lower portions of the band mill as shown. The band mill is shown as a vertical band mill, and thus the first and second wheels are upper and lower wheels, respectively. However, the band mill could be positioned so as to be a horizontal, or an oblique band mill as will be described. The wheels are spaced apart along a longitudinal axis 16 of the body, and are adapted to carry and drive an endless saw 17 which passes as a loop over the wheels. As will be described with reference to FIG. 4, the first wheel 13 is movable generally longitudinally of the body to vary saw strain. The lower wheel 14 is non-movable, except for replacement, and is powered through a pulley 19 and drive belt 20 which are powered by a motor 21 positioned below the band mill as shown. First and second wheel arbors 23 and 24 journal the first and second wheels 13 and 14 respectively, axes 23.1 and 24.1 of the arbors being located within a plane containing the longitudinal axis 16 which, for wheels of equal diameters, is parallel to cutting portions of the saw 17. The saw has saw guide portions 26 and 27 respectively which extend downwardly and upwardly from upper and lower portions of the band mill to guide a cutting portion 29 of the saw as is common practice. Lumber to be cut, not shown, passes through the cutting portion 29 up to a maximum width determined by throat 31 of the band mill.

The body has first and second side members 35 and 36 which are spaced apart and disposed generally parallel to each other as best seen in FIG. 3-A and 3-B. The side members are generally flat sheet members and have aligned recesses adjacent opposite ends thereof as follows. As seen in FIG. 1, the second side member 36 has an upper recess 39 having parallel side walls 41 and 42 which are disposed symetrically of the axis 16. The first side member 35 has a similar upper recess 44, not shown in FIG. 1, similarly disposed relative to the axis 16 so as to be aligned with the first recess 39. The recesses 39 and 44 are termed a first pair of aligned recesses at the upper ends of the first and second side members respectively.

The recess 39 and 44 carry second and first arbor mounting means 48 and 47 respectively which cooperate with the aligned recesses 39 and 44 to mount the first arbor 23 and wheel 13 for guided movement as will be described.

Figure 2:
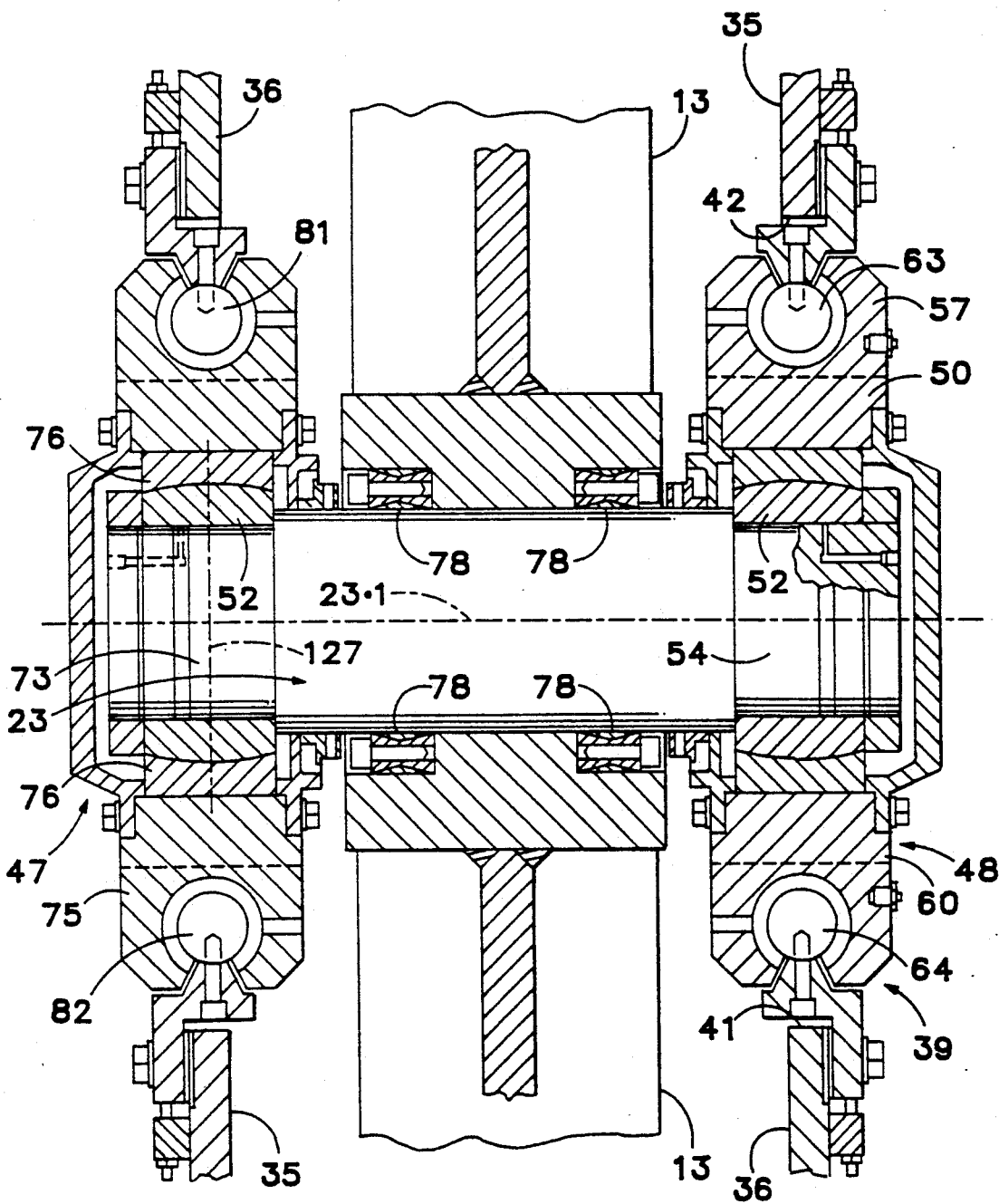
FIG. 2 is a simplified fragmented section on line 2—2 of FIG. 1, some portions being omitted for clarity, FIG. 3-A is a simplified fragmented end elevation, some portions being removed or in section, showing an upper portion of the bandmill of FIG. 1, FIG. 3-B is a simplified fragmented end elevation, some portions being removed or in section showing a lower portion of the bandmill of FIG. 1, and being a continuation of FIG. 3-A.

Referring to FIGS. 2, 3-A and 4, the second arbor mounting means 48 has a bearing housing 50 having a central recess to receive a main spherical bearing 52 to journal an end portion 54 of the arbor 23. The bearing housing also has aligned pairs of linear bearing mounts 57 and 58 on the one side, and 60 and 61 on an opposite side thereof. A pair of spaced parallel vertical guide bars 63 and 64 extend between a lower edge 66 of the recess 39, and an upper horizontal member 68 which interconnects upper portions of the recess 39. The linear bearings fitted in the mountings 57, 58, 60 and 61 permit the bearing housing 50 to move freely upwardly and downwardly, and accurately parallel to the longitudinal axis 16 of the band mill. A resilient means 67 has a body 69 connected to the upper member 68, and a moveable ram 71 which cooperates with the bearing housing 50. The ram 71 is forced resiliently outwardly from the body 69 so as to tend to move the bearing housing 50 towards the lower edge 66 of the recess. The resilient means 67 has a captive air bag spring, or a mechanical coil spring, which generates a downward force which can be easily overcome by upward force from the strain system of the invention as will be described. The resilient means is only necessary if the bandmill is used in a horizontal disposition where gravity does not return the bearing housing automatically towards the recess 66. The means 67 would normally only be used during servicing of the bandmill in the horizontal position and does not function during normal operation. A lower portion of the bearing housing 50 carries a connecter bearing 70 which cooperates with a strain control mechanism as will be described.

The first arbor mounting means 47 is generally similar to the second arbor mounting means 48, and has a bearing housing 75 which carries a similar main spherical bearing 76 which journals a respective end portion 73 of the arbor 23.

Undesignated means are provided to seal the main bearings, and provide lubrication for the bearings as is well known in the art. The wheel 13 is securely fixed to the arbor 23 by known locking assemblies 78 so that the arbor rotates as a live arbor with the wheel 13. The guide bars 63 and 64, and equivalent guide bars 81 and 82 are secured to the side members 35 and 36 with means to permit accurate setting so that all guide bars are parallel to each other to ensure smooth upward and downward sliding of the first arbor mounting means 47 relative to the body.

Referring to FIG. 3-B, the second wheel 14 is similarly secured to the second wheel arbor 24, which has opposite first and second end portions 83 and 84 which are journalled in bearings 85 and 86 which are secured to the first and second side members respectively. The arbor 24 also carries the pulley 19 to receive power from the drive belt 20 for powering the wheel 14. As seen in FIG. 1, the side member 36 has a lower recess 89 having parallel side walls and a connecting wall generally similar to the upper recess 39. A bearing housing 93 carries the main bearing 86 and is secured to the side member 36 so as to mount the bearing relative to the side member. The lower end of the side member 35 has a similar recess, not shown, which receives a similar bearing housing 91, FIG. 3-B, so that both bearing housing are simply secured adjacent to side walls of the respective aligned recesses. Thus it can be seen that the arbor mounting means of the first wheel cooperates with the first pair of aligned recesses at one end of the first and second side members respectively, and the second wheel arbor journalling the second wheel has end portions cooperating with a second pair of aligned recesses at opposite ends of the side members.

Referring to FIGS. 3-A and 4, the band mill includes first and second bell-crank means 97 and 98 which have bearings 95 and 96 respectively journalled for independent rotation relative to the body about a common bell-crank bearing pin 100. The pin 100 extends between the first and second side members 35 and 36, and is located adjacent a rear wall 102 of the body. The first bell-crank means 97 has an outer portion 104 which extends upwardly to connect with a connector bearing 103 of the first arbor mounting means 47, which is equivalent to the connector bearing 70 of FIG. 4. The first bell-crank means 97 has an inner portion 106 extending downwardly from the bearing pin 100 and being disposed at an angle 108 to the outer portion, the angle 108 being approximately 120 degrees. The second bell-crank means 98 has an outer portion 110 extending upwardly from the pin 100 and connected to the connector bearing 70 of the second arbor mounting means. Similarly, the second bell-crank means has an inner portion 112 extending downwardly from the pin 100 and disposed at an angle 114 to the outer portion 110, the angle 114 being approximately 90 degrees. It can be seen that each bell-crank means has a respective outer end portion connected to a respective arbor mounting means for moving independently, if needed, the arbor mounting means.

Figure 4:
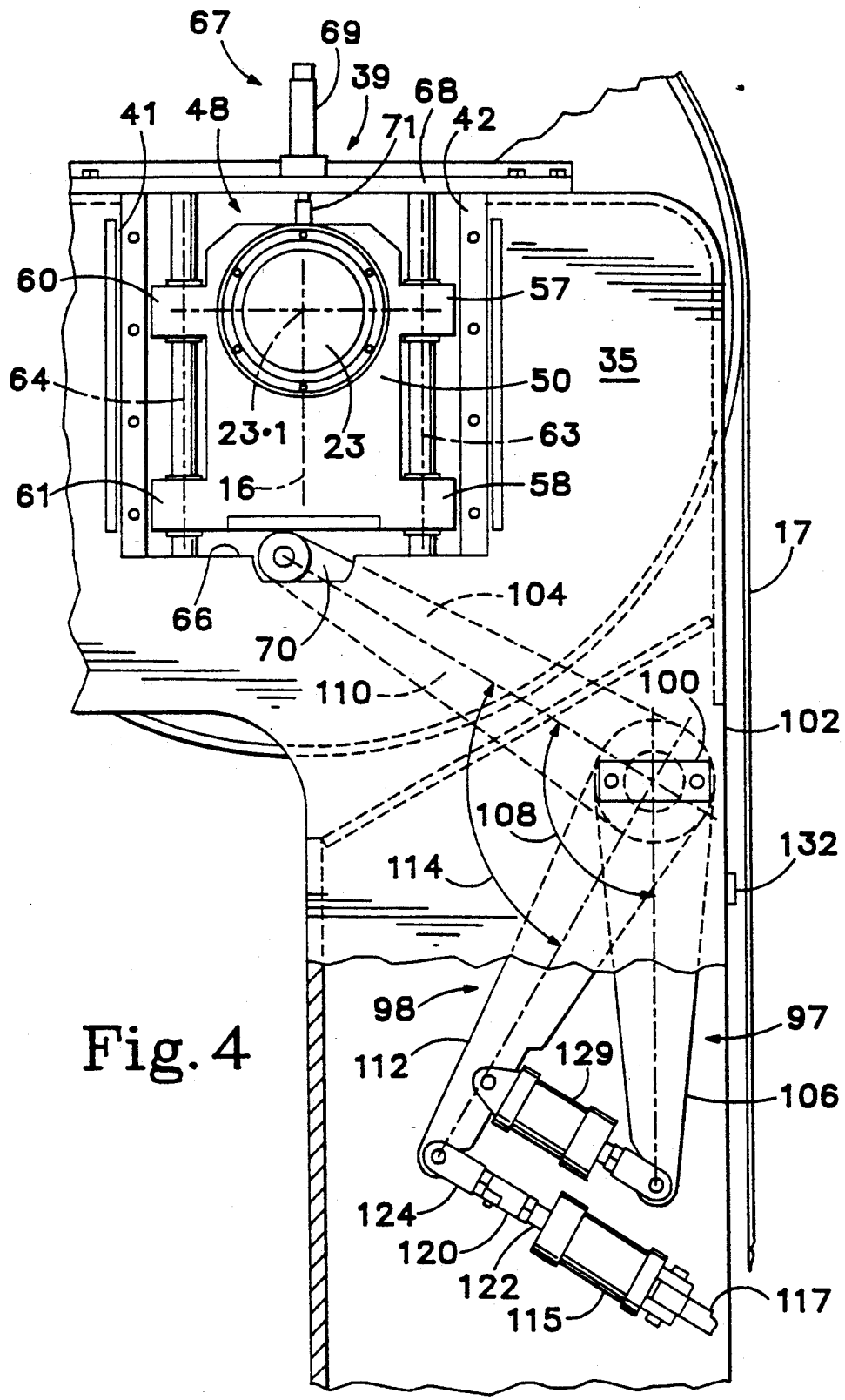
FIG. 4 is a simplified fragmented side elevation of portions of a band mill strain control means and one portion of an arbor mounting means for an upper wheel.

As best seen in FIG. 4, a hydraulic strain cylinder 115 extends between an end of the inner portion 112 of the second bell-crank means and a cylinder connection 117 connected to the rear wall 102 of the body. A load cell 120, which is a force transducer, is positioned between a ram 122 of the cylinder 115 and a clevis 124 connected to the inner portion 112. A hydraulic tilt cylinder 129 extends between the inner portion 112 of the second bell-crank means and the inner portion 106 of the first bell-crank means. Hydraulic hoses extend between the cylinders 115 and 129 as will be described with a reference to FIG. 5. It can be seen that actuation of the hydraulic strain cylinder 115, with the cylinder 129 being locked, causes concurrent rotation of the first and second bell-cranks means, which produces concurrent movement of the first and second arbor mounting means in the same direction. It can be seen that the force transducer 120 is disposed between the arbor mounting means carrying the first wheel and a portion of the body, i.e. the cylinder connection 117, cooperating with the strain cylinder 115 which moves the arbor of the first wheel to apply saw strain. Clearly, the force transducer is positioned to reflect load on wheels applied along the longitudinal axis 16..

Actuation of the cylinder 129, with the cylinder 115 being locked, produces relative rotation between the second bell-crank means, which is fixed by the cylinder 115, and the first bell-crank means, which moves the first arbor mounting means 47 by itself.

As best seen in FIG. 3-A, if the first arbor mounting means 47 is moved upwardly in direction of an arrow 126, while the second arbor mounting means 48 remains stationary, the arbor 23 effectively rotates about the main spherical bearing 52. More precisely, the axis 23.1 of the first wheel arbor rotates about a horizontal transverse axis 127 which passes through an effective center of the spherical bearing 52. As seen in FIG. 2, the axis 127 is disposed normally to the arbor axis 23.1, and, as seen in FIG. 1, is also disposed normally to the longitudinal axis 16 of the bandmill. Thus, the bell-crank means 97, 98, and tilt cylindler 127, together with the first and second arbor mounting means serve as tilting means for tilting the wheel arbor about a second axis, that is the axis 127, to provide a tiltable wheel to vary track of the saw on the wheels.

Tilting a wheel arbor is well known, but the present apparatus provides a simple means of effecting the tilting, within a relatively small space defined by the first and second side members 35 and 36. Complete enclosure of the arbor tilting means results in a relatively narrow bandmill which can be fitted closely to adjacent similar bandmills, and similarly protects the tilting mechanism from the environment of the saw mill. Many prior art bandmills have arbor tilting means which are fitted externally of the body of the bandmill, and require considerable lateral space on each side of the saw, which limits close fitting of adjacent bandmills in a multiple bandsaw set-up. Similarly, it can be seen that the mounting of the main bearing housings on linear bearings carrying the first and second end portions of the first wheel arbor also provides a relatively compact unit, which also contrasts with the prior art. The guide bars 63 and 64 guide the arbor mounting means for movement relative to the body which is generally parallel to the longitudinal axis thereof.

The cylinders 115 and 129 serve as first and second power means, in which the first power means extends between the inner end portion of the second bell-crank means and the body, and the second power means extends between the inner end portions of the first and second bell-crank means.

Figure 5:
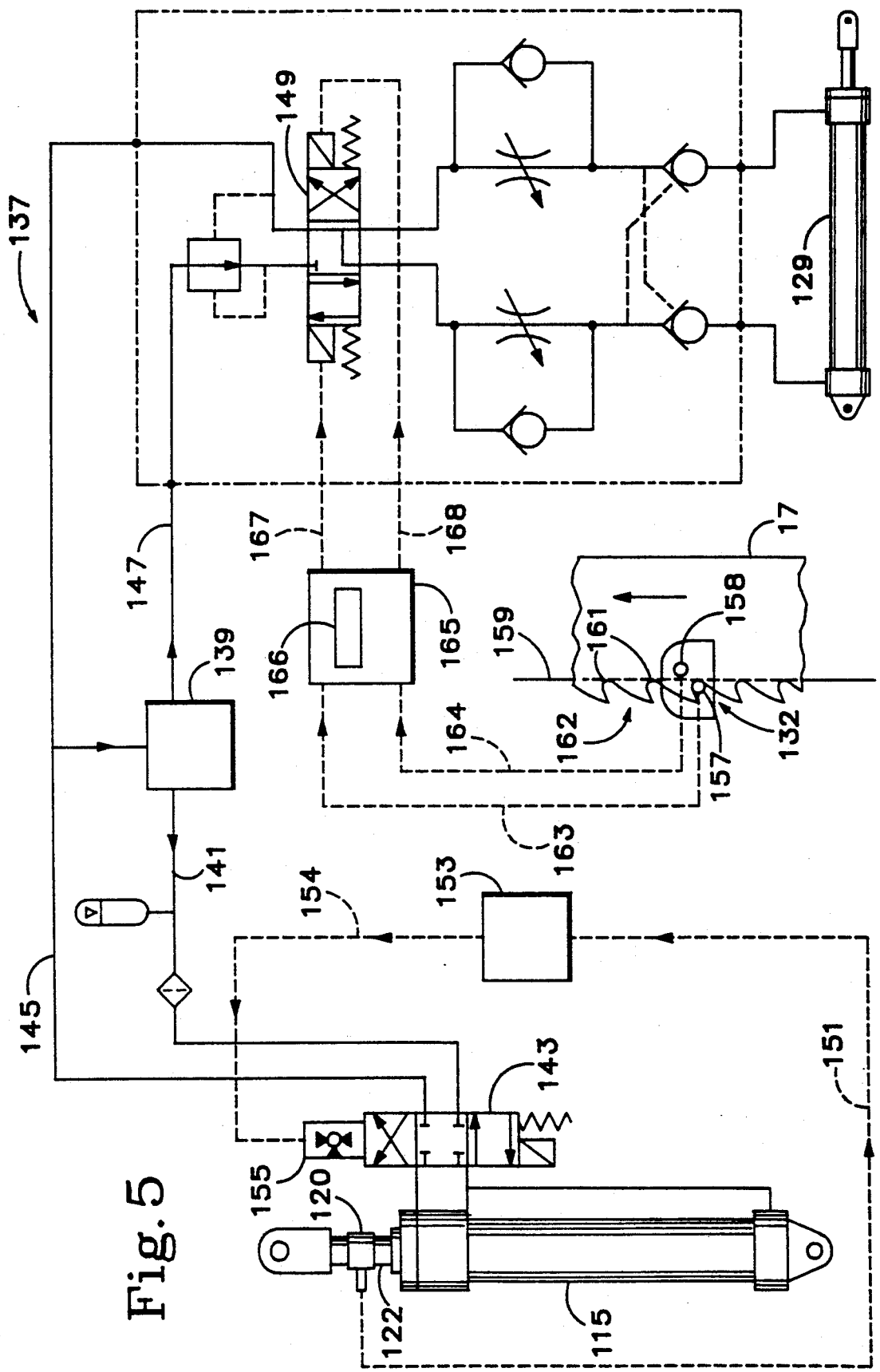
FIG. 5 is a simplified block schematic of main hydraulic and electronic components used in the invention.

A proximity switch assembly 132, or other types of non-contact sensors, is located adjacent the rear wall 102 of the band mill and closely adjacent the cutting edge of the saw 17, as will be described in greater detail with reference to FIG. 5. The proximity switch assembly serves as a portion of an automatic tilt control mechanism according to the invention, and is located remote from the cutting portion 29 of the saw so as to be relatively free of contaminants from saw cutting, such as water, sawdust, etc.

FIG. 5

A hydraulic circuit 137 is used to control the two aspects of the invention, namely, the automatic strain control means, and the automatic wheel tilt control means. Electrical components are shown schematically, with electrical connections being shown as broken lines. The hydraulic circuit receives hydraulic fluid under a controlled flow rate and pressure from a known hydraulic power pack 139. The power pack has a strain output line 141 extending to the strain cylinder 115 through a 4-way servo valve 143. A scavenge line 145 returns fluid under low pressure from the servo valve. The power pack also has a tilt output line 147 which extends to a 4-way valve 149 and then to the tilt cylinder 129.

The load cell or force transducer 120 mounted to cooperate with the strain cylinder 115 has an electrical connection 151 to a servo controller 153. The servo controller has a servo output connection 154 which extends to a servo valve input 155 for controlling the valve 143.

The proximity switch assembly 132 has first and second proximity switches 157 and 158 which are located on opposite sides of a saw blade datum 159 of the saw 17. The saw blade datum is a straight line connecting gullets 161 of a cutting portion 162 of the saw. The proximity switch 157 is located on the gullet side of the line or datum 159, and the switch 158 is located on the opposite side, that is adjacent the main body of the saw. As the saw passes the proximity switch 157, the switch is alternately exposed to a tooth and a gullet, but at high speed the proximity switch only senses the gullets, that is the air space between the teeth. In contrast, the proximity switch 158 senses continuous metal of the saw, and thus provides an opposite signal to that of the switch 157. The outputs from the proximity switches 157 and 158 are fed through output conductors 163 and 164 into a servo controller 165 which has servo output conducters 167 and 168 which extend to the 4-way valve 149.

The servo controllers 153 and 165 of both the strain cylinder 115 and the tilt cylinder 129 are portions of feedback systems which are designed to ensure saw strain and saw tracking are maintained within preset limits. The force transducer 120 generates a strain signal reflecting saw strain which is compared with a desired range of saw strain by electronics within the servo controller 153. Similarly, the proximity switch assembly generates a signal reflecting an amount by which the saw blade datum 159 or teeth of the saw has deviated from a desired position relative to the two wheels. This deviation is compared with a pre-set range within the servo controller 165. The feedback systems of both controllers generate signals which represent the deviation of a value, that is the saw strain or the saw tracking position, from a desired value, and a signal is generated by the controllers to actuate the appropriate valve to actuate the cylinder to correct the deviation, and to bring it back within limits.

Alternatively, automatic tilting of the arbor can be eliminated, or switched off, and a visual display of saw tracking accuracy can be obtained, although both the display and automatic tracking can be combined in one unit. A visual display means 166 can be incorporated in the servo controller 165, or it can be used separately therefrom. The visual display would indicate the deviation of the saw tracking from a desired saw tracking and could be by way of a digital read-out. The read-out of tracking accuracy could then be used by an operator who would adjust the arbor tilt manually, usually from a remote location for safety. In this arrangement, it could be seen that the invention could be easily applied as a retro-fit unit to existing bandmills to provide an accurate sensing of the saw tracking with a visual display. In this alternative a comparator means would be substituted for the servo controller, the comparator means having a monitor for providing the display. The comparator means would process the two sensor output signals and generate a comparator output signal responsive to the two sensor output signals. Display means for displaying the comparator output signal to reflect accuracy of saw tracking are connected to the comparator following common practice.

The tolerance to saw tracking accuracy can be varied by providing means to permit adjustment of spacing between the proximity switches 157 and 158 for example, screws in elongated slots of a mounting plate. Clearly, increasing space between the proximity switches increases lateral movement of the saw that can occur prior to the proximity switches detecting loss of tracking accuracy. Conversely, moving the proximity switches closer together increases sensitivity of the unit.

As indicated earlier, magnetic proximity switches or other non-contact sensors can be used for detecting the cutting edge of the saw. For example, a photoelectric cell and a light beam used in combination can provide a similar output which can be used for sensing movement of the gullets past the photocell which cause intermittent blockage of light onto the photocell. Continuous metal of the saw remote from the gullets causes continuous blockage of light. Other types of non-contact sensors could also be substituted. Whichever type is used, the method of detecting tracking of the saw is basically the same, and is as follows. A first sensor output signal is generated which reflects movement of a cutting portion of the saw past the first sensor in which gullets alternate with saw teeth to provide alternating exposure to the first sensor of the saw teeth, and to air within the gullets. A second sensor output signal is generated which reflects movement of continuous metal of the bandsaw blade past the second sensor. The first and second sensor output signals are processed so as to generate comparator output signal responsive to the sensor output signals. The comparator output signal is processed to provide a visual display thereof which displays accurately the tracking of the bandsaw. Usually, the tracking of the bandsaw is measured relative to an edge of the wheel which serves as a tracking datum, as overhang of the teeth over the edge of the wheel is usually the important measurement. A tracking datum other than the edge of the wheel can be substituted.

FIG. 6

The bandmill 10 has been described as a vertical bandmill, and a typical configuration of a setting vertical bandmill is shown in FIG. 6. The bandmill 10 is mounted on a support frame 170 which has a pair of spaced vertical legs 171 and 172 which support a pair of spaced horizontal rail supports 175 and 176. The rail supports carry respective rails, not shown, which cooperate with respective rail guides 180 at upper and lower portions of the mill. A setting cylinder or screw 183 extends between the leg 171 and a setting support 184 secured to the mill. The mill is positioned over a pit 187 which collects refuse from sawing, and it is noted that the motor 21 has been repositioned to a position 21.1 so as to clear the pit. Actuation of the setting screw or cylinder 183 shifts the bandmill in directions of an arrow 188.

FIG. 7

The bandmill 10 is shown positioned as a horizontal bandmill and is carried on a pair of spaced vertical legs 191 and 192. The legs are connected at an upper end by a horizontal support 194, and lower end of the legs straddle a refuse pit 196. The legs 191 and 192 carry respective vertically disposed rails, not shown, which cooperate with rail guides, not shown, carried on the bandmill. A setting means 198 extends between the support 194 and the bandmill to shift the bandmill vertically as shown by an arrow 199. The bandmill 10 is thus capable of being adapted for vertical, horizontal or slanting use without major modifications, thus contrasting with prior art bandmills.

OPERATION

The invention operates in many ways similarly to a conventional band mill, with the exception that the band mill operator does not require to manually adjust the saw tension, or tracking of the wheel by adjusting arbor tilt. Instead, a desired saw strain can be programmed into the servo controller 153, and the proximity switches can be adjusted relative to the edges of the wheels to ensure that the datum line of a particular saw extending between the gullets of the saw teeth is within a particular reference plane relative to the wheel. Clearly, spacing between the proximity switches of the assembly 132 determines allowable tolerance of the saw datum to deviate relative to the wheel, and this can be held to relatively close tolerance, for example within 1 or 2 millimeters of the desired tracking position.

The bandmill motor is started and when the saw is up to speed and the desired strain is attained, the saw should be tracking accurately within the required tolerance. When material is fed through the saw, should the cutting edge become overheated, or knots in the lumber being cut cause the saw to deflect from its normal course, so that tracking or strain of the saw exceeds the pre-set limits, automatic correction signals are generated as follows. The proximity switches will generate an excess deviation signal which is fed through the servo controller 165 to the 4-way valve 149. The valve is actuated to direct fluid to whichever side of the tilt cylinder 129 is necessary to shift the arbor to bring the saw back into the desired tracking position. Similarly, when the saw strain signal exceeds pre-determined limits for any reason, the force transducer 120 will generate an excess deviation signal, which is fed through the servo controller 153 to the valve 143, which shifts in a desired direction to increase or decrease strain by actuating the strain cylinder 115.

It can be seen that the load cell 120 serves as a strain sensing means for producing a strain output signal which reflects applied saw strain. Similarly, it can be seen that the proximity switch assembly serves as a track sensing means for producing a tracking output signal which reflects tracking of the saw relative to the wheels.

Also, it can be seen that the first and second bell-crank means 97 and 98, the strain cylinder 115, associated valve 143, connections and servo controller 153 serve as a strain control means for selectively moving automatically the first wheel along the longitudinal axis to maintain desired saw strain. It is seen that the strain control means cooperates with the first wheel and with the strain sensing means, i.e. the transducer 120, so as to be responsive to the strain output signal. Similarly, the bell-crank means 97 and 98, and the tilt cylinder 129, the valve 149 and associated connections serve as saw tracking control means for selectively tilting the tiltable wheel, that is the first wheel, to maintain the saw within a desired tracking position. It is seen that the tracking control means cooperates with the tilting means and the tracking sensing means so as to be responsive to the tracking output signal generated by the proximity switches. The first end of the arbor is mounted for movement relative to the second end of the arbor to provide the tilting of the first wheel, which permits adjustment of the tracking of the saw.

It can be seen that the first and second bell-crank means 97 and 98 serve as first and second link means connected to the first and second arbor mounting means. The strain cylinder 115 is a first power means for moving the first and second link means concurrently relative to the body for adjusting strain, with the first power means extending between the link means and the body. The tilt cylinder 129 serves as a second power means moving the first arbor mounting means relative to the second arbor mounting means, the second power means extending between the first link means and the second link means. Clearly, the force transducer is a strain sensing means which cooperates with the first wheel so as to be responsive to the force on the first wheel generated by the saw strain.

It can be seen that the method of the invention includes automatically sensing actual tracking of the saw blade relative to the wheels, automatically comparing the actual tracking of the saw blade relative to a desired tracking position of the saw blade, and automatically adjusting tilt of a tiltable wheel so that the actual tracking of the saw on the wheels is varied to approach the desired tracking position. The method also includes automatically detecting actual saw strain, automatically comparing the actual saw strain with a desired saw strain and automatically adjusting distance between the wheel to vary force therebetween so that the actual saw strain is varied to approach the desired saw strain. It can be seen that the actual saw strain is detected by detecting longitudinal force between the wheels.

We claim:

1. A bandmill comprising:
   a body having first and second side members spaced apart and disposed generally parallel to each other,
   an endless toothed bandsaw,
   first and second substantially co-planar wheels spaced apart along a longitudinal axis of the body and carrying the endless bandsaw, the wheels being located between the first and second side members,
   a first wheel arbor journalling the first wheel for rotation,
   first and second arbor mounting means for carrying the first wheel arbor, the arbor mounting means cooperating with the first and second side members respectively at one end of the body to permit guided movement of the arbor mounting means relative to the body, which movement is generally parallel to the longitudinal axis,
   a second wheel arbor journalling the second wheel for rotation at the end of the body opposite said one end, and
   arbor moving means for selectively moving the first and second arbor mounting means along the longitudinal axis, said arbor moving means comprising a first force transmission member engaging the first arbor mounting means, a second force transmission member engaging the second arbor mounting means, first power means effective between the body and the first force transmission member, and second power means effective between the first force transmission member and the second force transmission member.

2. A bandmill according to claim 1, wherein the body comprises guide means disposed generally parallel to the longitudinal axis of the body, and the first and second arbor mounting means comprise first wheel arbor journals mounted for movement along the guide means and adapted to journal the first wheel arbor for rotation.

3. A bandmill according to claim 1, wherein the first and second side members are generally flat and the arbor moving means is located between the first and second side members.

4. A bandmill comprising:
   a body,
   an endless toothed saw,
   first and second substantially co-planar wheels spaced apart along a longitudinal axis of the body and carrying the endless saw, the first wheel being tiltable about a second axis to vary tracking of the saw on the wheels, the second axis being substantially normal to the longitudinal axis,
   saw tracking sensing means for producing a tracking output signal which reflects tracking of the saw relative to the wheels, and
   saw tracking control means responsive to the tracking output signal for selectively tilting said first wheel to maintain the saw within a desired tracking range, said saw tracking sensing means comprising first and second non-contact sensors, mounting means for mounting the sensors relative to the saw so that when the saw is within a desired tracking range the first sensor detects gullets of the saw and the second sensor detects continuous metal of the saw remote from the gullets, the first and second sensors providing first and second sensor output signals respectively, and comparator means for processing the sensor output signals and generating a comparator output signal responsive to the first and second sensor output signals.

5. A bandmill according to claim 4, wherein the first and second side members are generally flat and said common axis is perpendicular to the side members.

6. A bandmill according to claim 5, further comprising first and second arbor mounting means for carrying the first and second end portions of the first arbor respectively, the arbor mounting means being guided for movement relative to the body, which movement is parallel to the longitudinal axis, and wherein the saw tracking control means comprises arbor moving means for differentially moving the first and second arbor mounting means parallel to the longitudinal axis so as to move one mounting means relative to the other mounting means and thereby tilt the first wheel arbor and vary tracking of the saw.

7. A bandmill according to claim 4, comprising means to permit adjustment of spacing between the sensors so as to vary saw tracking tolerance.

8. A bandmill according to claim 4, wherein the non-contact sensors are magnetic proximity switchers.

9. A bandmill according to claim 4, further comprising display means connected to receive the comparator output signal to provide a display reflecting accuracy of saw tracking.

10. A bandmill comprising:
a body,
an endless toothed saw,
first and second substantially co-planar wheels spaced apart along a longitudinal axis of the body and carrying the endless saw,
strain sensing means for producing a strain output signal which reflects applied saw strain,
a first wheel arbor journalling the first wheel for rotation, the first wheel arbor having first and second end portions,
first and second arbor mounting means for carrying the first and second end portions respectively of the first arbor, the arbor mounting means being guided for movement relative to the body parallel to the longitudinal axis,
a first force transmission member movable relative to the body and in engagement with the first arbor mounting means,
a second force transmission member movable relative to the body and in engagement with the second arbor mounting means,
a first power means acting between the first and second force transmission members for selectively restraining the first and second force transmission members against movement relative to each other,
a strain adjustment power means acting between the body and the first force transmission member, so that when the strain adjustment power means is actuated, the first and second arbor mounting means are moved equally relative to the body so as to vary saw strain, and
strain control means responsive to the strain output signal for controlling the strain adjustment power means for automatically maintaining a desired saw strain.

11. A bandmill according to claim 10, wherein the strain sensing means is a force transducer positioned to reflect load applied to the force transmission members by the first strain adjustment power means.

12. A bandmill according to claim 10, wherein the first and second force transmission members comprise first and second bell-crank members journalled for rotation relative to the body, each bell-crank member having a respective outer end portion in engagement with a respective arbor mounting means, and a respective inner end portion cooperating with the strain adjustment power means, so that actuation of the strain adjustment power means rotates the first and second bell-crank members together to vary saw strain.

13. A bandmill according to claim 10, further comprising:
saw tracking sensing means for producing a tracking output signal which reflects tracking of the saw relative to the wheels, and
saw tracking control means responsive to the tracking output signal and acting on said first power means for tilting said first wheel about an axis that is substantially normal to the longitudinal axis and automatically maintaining the saw within a desired tracking range.

14. A bandmill according to claim 13, wherein said first power means extends between the first force transmission member and the second force transmission member for causing relative movement of the first arbor mounting means and the second arbor mounting means, so that when the first power means is actuated in response to the saw tracking control means, the first and second arbor mounting means are moved differentially so as to tilt the first wheel.

15. A bandmill according to claim 14, wherein the first and second force transmission members comprise first and second bell-crank members respectively, each bell-crank member being journalled for rotation relative to the body and having a respective outer end portion in engagement with a respective arbor mounting means for moving the mounting means, and a respective inner end portion cooperating with the strain adjustment power means, and wherein the first power means extends between the inner end portions of the first and second bell-crank members, so that actuation of the first power means causes relative rotation of the first and second bell-crank members to vary tilt of the first wheel.

16. A bandmill according to claim 10, wherein the first and second force transmission members comprise respective levers that are journalled for pivotal movement relative to the body.

17. A bandmill according to claim 10, wherein the first and second force transmission members comprise respective bell-crank members that are journalled for pivotal movement relative to the body, each bell-crank member has first and second arms extending from the its pivot axis, the first arm of each bell-crank member has a distal end in engagement with a respective arbor mounting means, the first power means is effective between the second arm of the first bell-crank member and the second arm of the second bell-crank member, and the strain adjustment power means is effective between the body and the second arm of the first bell-crank member.

18. A bandmill according to claim 17, wherein the bell-crank members are journalled for pivotal movement about a common axis.

19. A bandmill according to claim 18, wherein the body comprises first and second side members that are generally flat, the first and second wheels are disposed between the first and second side members, the saw has a first run extending through a throat portion of the bandmill and a second run extending substantially parallel to the first run and spaced therefrom, said common axis is between the first and second runs of the saw and is substantially closer to the second run of the saw than to the first run thereof, and the bell-crank members are located between the first and second side members.

20. A bandmill comprising:
a body, an endless toothed saw, first and second substantially co-planar wheels spaced apart along a longitudinal axis of the body and carrying the endless saw, the first wheel being tiltable about a second axis to vary tracking of the saw on the wheels, the second axis being normal to the longitudinal axis, a first wheel arbor journalled the first wheel for rotation, the first wheel arbor having a first end portion mounted for movement relative to a second end portion thereof for tilting the arbor and the first wheel, first and second arbor mounting means for carrying the first and second end portions respectively of the first arbor, the arbor mounting means being guided for movement relative to the body, which movement is parallel to the longitudinal axis, saw tracking sensing means for producing a tracking output signal which reflects tracking of the saw relative to the wheels, saw tracking control means responsive to the tracking output signal for selectively tilting said first wheel to maintain the saw within a desired tracking range, said saw tracking control means comprising first and second link means connected to the first and second arbor mounting means respectively, and power means extending between the first link means and the second link means for moving the first arbor mounting means relative to the second arbor mounting means, so that when the power means is actuated, the first mounting means is moved relative to the second mounting means so as to tilt the first wheel and vary tracking of the saw.

21. A bandmill according to claim 20, wherein the first and second link means are first and second bell-crank means journalled for rotation relative to the body, each bell-crank means having a respective outer end portion connected to a respective arbor mounting means for moving the mounting means, and a respective inner end portion cooperating with the power means, so that actuation of the power means rotates the end portion of the first bell-crank means relative to the end portion of the second bell-crank means so as to vary tilt of the first wheel.

22. A bandmill comprising:
a body having first and second side members spaced apart and disposed generally parallel to each other, the first and second side members being generally flat and disposed substantially parallel to each other, the first side member comprising a first guide means extending parallel to a longitudinal axis of the body and the second side member comprising a second guide means extending substantially parallel to the longitudinal axis, said first and second guide means being at one end of the body, an endless toothed bandsaw, first and second substantially co-planar wheels spaced apart along the longitudinal axis of the body and carrying the endless bandsaw, the wheels being located between the first and second side members, a first wheel arbor journalling the first wheel for rotation, first and second carriages for carrying the first wheel arbor, the first carriage being mounted on the first guide means for movement therealong generally parallel to the longitudinal axis and the second carriage being mounted on the second guide means for movement therealong generally parallel to the longitudinal axis, a second wheel arbor journalling the second wheel for rotation at the end of the body opposite said one end, and arbor moving means located between the first and second side members and engaging the first and second carriages for selectively moving the first and second carriages along the longitudinal axis.

23. A bandmill according to claim 22, wherein the first and second side members have respective recesses at said one end of the body, and wherein the first guide means comprises a first pair of guide members spaced apart across the recess of the first side member and the second guide means comprises a second pair of guide members spaced apart across the recess of the second side member.

24. A bandmill comprising:
a body having first and second side members spaced apart and disposed generally parallel to each other, an endless toothed bandsaw, first and second substantially co-planar wheels spaced apart along a longitudinal axis of the body and carrying the endless bandsaw, the wheels being located between the first and second side members, a first wheel arbor journalling the first wheel for rotation, first and second arbor mounting means for carrying the first wheel arbor, the arbor mounting means cooperating with the first and second side members respectively at one end of the body to permit guided movement of the arbor mounting means relative to the body, which movement is generally parallel to the longitudinal axis, a second wheel arbor journalling the second wheel for rotation at the end of the body opposite said one end, and first and second levers journalled for pivotal movement relative to the body about a common axis that is spaced from the first and second arbor mounting means, the first lever having an end portion that is spaced from said common axis and engages the first arbor mounting means and the second lever having an end portion that is spaced from said common axis and engages the second arbor mounting means, whereby the first and second arbor mounting means can be moved selectively along the longitudinal axis.

25. A bandmill according to claim 24, wherein the arbor moving means further comprise first power means effective between the body and the first lever and second power means effective between the first and second levers.

26. A bandmill comprising:
a body, an endless toothed saw, first and second substantially co-planar wheels spaced apart along a longitudinal axis of the body and carrying the endless saw, a first wheel arbor journalling the first wheel for rotation, the first wheel arbor having first and second end portions, first and second arbor mounting means for carrying the first and second end portions of the first wheel arbor, the arbor mounting means being guided for movement relative to the body in directions parallel to said longitudinal axis, a first force transmission member movable relative to the body and engaging the first arbor mounting means, a second force transmission member movable relative to the body and engaging the second arbor mounting means, a tilt adjustment power means effective between the first and second force transmission members for moving the first and second arbor mounting means differentially, parallel to the longitudinal axis of the body, to vary tilt of said first wheel so as to vary track of the saw on the wheels, and a strain adjustment power means effective between the body and said first force transmission member for moving the first and second arbor mounting means together, parallel to the longitudinal axis of the body, to vary saw strain.

27. A bandmill according to claim 26, wherein the first and second side members are generally flat, the first and second levers are located between the side members and said common axis is perpendicular to the side members.

28. A bandmill according to claim 27, wherein the force transducer is disposed between the strain adjustment power means and said first force transmission member.

29. A bandmill according to claim 26, comprising a saw tracking sensing means for producing a tracking output signal which reflects tracking of the saw relative to the wheels, and saw tracking control means response to the tracking output signal and acting on the tilt adjustment power means to maintain the saw within a desired tracking range.

30. A bandmill according to claim 26, wherein the first and second force transmission members comprise first and second levers respectively, the first and second levers being journalled for pivotal movement relative to the body, the first lever having an end portion that is spaced from its pivot axis and engages the first arbor mounting means and the second lever having an end portion that is spaced from its pivot axis and engages the second arbor mounting means.

31. A bandmill according to claim 30, wherein the tilt adjustment power means is effective between the first and second levers and the strain adjustment power means is effective between the body and said first lever.

32. A bandmill according to claim 31, wherein the first and second levers comprise first and second bell-crank members respectively, said bell-crank members being journalled for pivotal movement about a common axis and each having first and second arms extending form said common axis, the first arm of the first bell-crank member engaging the first arbor mounting means, the first arm of the second bell-crank member engaging the second arbor mounting means, the tilt adjustment power means being effective between the second arms of the two bell-crank members, and the strain adjustment power means being effective between the body and the second arm of the first bell-crank member.

33. A bandmill according to claim 26, wherein the body had first and second side members spaced apart and disposed generally parallel to each other, the first side member includes a first pair of guide members extending parallel to the longitudinal axis and spaced apart perpendicular to the longitudinal axis, the second side member includes a second pair of guide members extending parallel to the longitudinal axis and spaced apart perpendicular to the longitudinal axis, the first arbor mounting means comprises a first carriage mounted on the first pair of guide members for movement therealong, and the second arbor mounting means comprises a second carriage mounted on the second pair of guide members for movement therealong.

* * * * *

UNITED STATES PATENT AND TRADEMARK OFFICE
CERTIFICATE OF CORRECTION

PATENT NO. : 5,237,897
DATED : August 24, 1993
INVENTOR(S) : Ralph WIJESINGHE et al It is certified that error appears in the above-indentified patent and that said Letters Patent is hereby corrected as shown below:

Col. 15, Claim 22, line 10, "journalled" should read --journalling--.

The following claims should be included:

34. A bandmill according to claim 1, wherein the first and second force transmission members comprise first and second bell-crank members respectively, said bell-crank members being journalled for rotation relative to the body about a common axis, each bell-crank member having a respective outer end portion in engagement with a respective arbor mounting means for moving the mounting means and also having a respective inner end portion, said first power means being effective between the body and the inner end portion of the first bell-crank member, and said second power means being effective between the inner end portions of the first and second bell-crank members, so that actuation of the second power means causes relative rotation of the first and second bell-crank members to vary tilt of the first wheel and actuation of the first power means causes the first and second bell-crank members to rotate together to vary saw strain.

35. A bandmill according to claim 4, comprising a first wheel arbor journalling the first wheel for rotation, the first

UNITED STATES PATENT AND TRADEMARK OFFICE
CERTIFICATE OF CORRECTION

PATENT NO. : 5,237,897
DATED : August 24, 1993
INVENTOR(S) : Ralph WIJESINGHE et al It is certified that error appears in the above-indentified patent and that said Letters Patent is hereby corrected as shown below:

wheel arbor having a first end portion mounted for movement relative to a second end portion thereof for tilting the arbor and the first wheel.

36. A bandmill according to claim 26, comprising a force transducer for producing a strain output signal which reflects saw strain, and strain control means responsive to the strain output signal and acting on the strain adjustment power means to maintain a desired saw strain.

Col.12, Claim 5, line 1, "claim 4" should read --claim 34--.
Col.12, Claim 6, line 1, "claim 5" should read --claim 35--.
Col.12, Claim 27, line 1, "claim 26" should read --claim 24--.
Col.12, Claim 28, line 1, "claim 27" should read --claim 36--.

Signed and Sealed this

Twenty-eight Day of March, 1995

Attest:

BRUCE LEHMAN

*Attesting Officer*     *Commissioner of Patents and Trademarks*